United States Patent Office 3,711,444
Patented Jan. 16, 1973

3,711,444
POLYOL SOLUTIONS OF XANTHATES AS CATALYSTS IN MAKING POLYISOCYANURATES
Michael George Allen, Hudson, Wis., and George Van Dyke Tiers, St. Paul, Minn., assignors to Minnesota Mining and Manufacturing Company, St. Paul, Minn.
No Drawing. Filed Nov. 9, 1970, Ser. No. 88,219
Int. Cl. C08g 22/40; C09k 3/00
U.S. Cl. 260—77.5 NC          14 Claims

ABSTRACT OF THE DISCLOSURE

Polyisocyanates are polytrimerized with novel xanthate salts, such as mono-sodium polypropylene ether glycol xanthate, to produce polyisocyanurates.

---

This invention relates to polyisocyanurates. In another aspect, it relates to making polyisocyanurates using xanthate salt catalysts. In a further aspect, it relates to isocyanate-derived crosslinked polymers containing isocyanurate and urethane linkages, and the preparation of such polymers using certain xanthate salt catalysts. In a still further aspect, it relates to novel xanthate salts and their preparation.

The polytrimerization of polyisocyanates to produce polyisocyanurates is known. A host of trimerization catalysts have been disclosed in the prior art, including the use of certain xanthate salt catalysts to trimerize mono-isocyanates and polytrimerize polyisocyanates (see U.S. Pat. 3,381,008). Though many of the catalysts disclosed are useful, many of them have limiting features. Many lack a reactive functional group other than the catalytic site and as such do not become an integral part of the resulting isocyanate-derived polymer. The consequent presence of the unbound or free catalyst in the polymer is often objectionable as it can exude or be leached from the polymer and contaminate materials in contact therewith. Where the polyisocyanate is trimerized in the presence of a polyol, prior art catalysts are often difficult to solubilize or disperse in the polyol and present practical mixing problems. Similar problems arise when the isocyanate it itself a prepolymer derived from a polyol. Further, reaction mixtures using many of the prior art catalysts do not have a pot life which is long enough for most practical purposes, particularly in making the polymer in bulk, due to the non-latent nature of such catalysts.

Briefly, we have discovered that polyisocyanates can be polytrimerized to yield useful polyisocyanurates by carrying out the polytrimerization in the presence of xanthate salt catalysts (or promoters) having the general formula $$(A)_n R-O-CS_2^\ominus M^\oplus$$

where A is a hydroxyl group or a hydrogen atom, R is a polyvalent saturated straight or branched aliphatic group (which can have one or more catenary ether oxygen atoms) such as alkylene, alkyleneoxyalkylene, or poly(alkyleneoxyalkylene), said alkylene moieties being straight or branched chain and having, for example, 2–18 carbon atoms, with the proviso that when A is a hydrogen atom, R has one or more of said caternary ether oxygens (e.g., R is alkyleneoxyalkylene), $n$ is an integer equal to $x-1$, where $x$ is the valence of said polyvalent saturated aliphatic group, $n$ preferably being 1 to 3, and M is a cation such as an alkali metal cation, e.g. sodium, potassium, or lithium, or a quaternary ammonium cation, e.g. tetraalkylammonium (the alkyl groups of which can have, for example, 1 to 18 carbon atoms each).

The xanthate salts, and polyol solutions thereof, used in this invention are relatively storage stable. The polyisocyanate or polyisocyanate-polyol mixtures mixed with such salts or solutions thereof are reaction mixtures having a desirable pot-life at ambient temperatures, e.g., 30 to 100° F. As such, the reaction mixtures are latently curable and can be readily applied, e.g. as a coating, or shaped and the applied or shaped reaction mixture then allowed to slowly cure or moderately heated, e.g. to 200° F., to effect rapid cure. The gel times of such reaction mixtures are relatively independent of the bulk of the applied or shaped reaction mixture and high catalyst levels can be used to get a "tight" or complete cure. Further, the gel times are not strongly dependent on catalyst concentration and the latter do not have to be accurately measured.

The above-described xanthate salts can be prepared by following known procedures (e.g. see Practical Organic Chemistry, A. I. Vogel, Longmans Green and Company, London, 3rd Ed., pp. 496, 499 (1956). A particularly useful procedure for making the xanthate salts of this invention comprises, as a first step, reacting a precursor polyol, such as dipropylene glycol, with a source of strong base such as alkali metal, or hydroxide or alcoholate thereof, e.g. sodium, sodium hydroxide, or sodium methoxide, to prepare the corresponding mono-salt of said polyol. Said mono-salt is then reacted, in a second step, with an amount of carbon disulfide equivalent to the amount of base, or in excess thereof to prepare the xanthate salt having the above-described formula. Preferably, in the first step, the source of base is reacted with a stoichiometric excess of the polyol so as to produce a polyol solution of the mono-salt, and this solution then, in the second step, is reacted with the carbon disulfide, so as to obtain the xanthate salt in the form of a solution thereof in said polyol. The solutions can have low concentrations, e.g. as low as 0.01 molal, though concentrations of greater than 0.03 molal are preferred when polyisocyanates having significant inherent acidity are used in this invention. Use of the xanthate salt catalyst in the form of such a solution enables one to intimately and rapidly admix the catalyst with the polyisocyanate, as well as with any polyol that may be present in admixture therewith. The polyol solvent in such solutions is, of course, a reactive solvent for the polyisocyanate as well and reacts therewith to form urethane linkages. It should be understood, however, that use of the xanthate salt in the form of a polyol solution is not essential to the practice of the broader aspects of this invention, though such solutions are preferred for reasons given above. Where the xanthate salt has catenary ether oxygens in its structure, such a salt will be miscible or readily compatible with the reactants where the polyisocyanate reactant used is a prepolymer based on a polyalkyleneoxy polyol, such as polypropylene ether glycol, or where the polyisocyanate is polytrimerized in the presence of such a polyol. Preferably, said xanthate salt has one or more hydroxyl groups in its structure such that, in addition to promoting the trimerization of the isocyanate groups, it reacts therewith forming urethane linkages and thus the catalyst becomes an integral part of the resulting polymer and will not exude therefrom. By becoming an integral part of the polymer, applied or shaped articles of the latter will not exhibit any significant shrinkage or weight loss, even when heated under vacuum.

The xanthate salts preferred in the practice of this invention are those having the general formula $$HO-R-O-CS_2^\ominus M^\oplus$$

where R is alkyleneoxyalkylene or poly(alkyleneoxy) alkylene, such as propyleneoxypropylene and poly(propyleneoxy)propylene, and where M is an alkali metal cation such as sodium, said xanthate salt preferably having a molecular weight from 200 to as high as 2,000 to 3,000 or higher. Representative xanthate salts which can be used include sodium dipropylene glycol mono-xanthate, sodium tripropylene glycol mono-xanthate, sodium diethylene glycol mono-xanthate, sodium triethylene glycol mono-xanthate, sodium polypropylene glycol mono-xanthate, sodium 1,2,6-hexane triol mono-xanthate, sodium poly(oxypropylene) triol mono-xanthate, and the corresponding potassium xanthate salts.

The polyisocyanates which can be polytrimerized with the xanthate salts of this invention are well-known. Particularly useful polyisocyanate compounds which can be used in this invention can be represented by the formula R(NCO)$_n$ where R is aryl or alkaryl and $n$ is 2 to 5 or higher, such as 2,4- and 2,6-tolylene diisocyanates;
1,5-naphthylene diisocyanates;
4,4'-diisocyanatophenylmethane;
3,3'-dimethyl-4,4'-biphenylene diisocyanate;
3,3'-dimethoxy-4,4' biphenylene diisocyanate,
3,3'-diphenyl-4,4'-biphenylene diisocyanate,
4,4'-biphenylene diisocyanate,
3,3-dichloro-4,4'-biphenylene diisocyanate, and
4,4',4''-triisocyanato-triphenylmethane.

The so-called polymeric polyisocyanates can be used, such as those obtained by phosgenation of polyamines prepared by condensing formaldehyde with aromatic amines, particularly useful polymeric polyisocyanates are the polymethylene polyphenyl isocyanates, such as those sold commercially under the trademarks of Mondur MR and MRS, Isonate 901 and 390P, and PAPI. A list of useful commercially available polyisocyanates is found in "Encyclopedia of Chemical Technology," Othmer, 2nd Ed., pp. 146–147, Interscience Pub., 1967 and in Appendix A of "Polyurethanes: Chemistry and Technology," by Saunders & Frisch, Part I, Interscience Pub. (New York, 1962). Urethane prepolymers, sometimes referred to as isocyanate-terminated prepolymers, can be used and are known (e.g. see U.S. Pat. Nos. 3,073,802 and 3,054,755), such prepolymers being prepared by reacting aromatic or so-called polymeric polyisocyanates with a polyol such a polyoxyalkylene polyol, typically, polypropylene glycol, using an excess of the polyisocyanate. Mixtures of various polyisocanates can be used to prepare the polymers of this invention. The polyisocyanates which are preferred are those commonly used in conjunction with polyols to prepare polyurethanes, including so-called urethane prepolymers.

Where the polyisocyanurate is prepared by poly-trimerizing polyisocyanate in the presence of polyol, conventional polyols used in making polyurethanes can be used. Such polyols include polyalkylene ether polyols and polyesters and polyester amides containing reactive hydroxyl groups. The polyols can have varying molecular weights, for example, between 90 and 3,000 or even as high as 5000. Where a harder polyisocyanurate is desired, the polyol will generally have a hydroxyl equivalent weight of 45 to 400 (i.e. one reactive hydroxyl group per 45 to 400 molecular weight of polyol). Where a softer, more rubbery polyisocyanurate is desired, the polyol will generally have an equivalent weight of 400 to 1000, or higher. The polyalkylene ether polyols are generally condensates of ethylene, propylene, or butylene oxides with glycerol, pentaerythritol, sorbitol, sucrose, methylglucosides, or low molecular weight polyols, such as propylene glycol, tri-, tetra-, penta-, hexamethylene glycols, 1,3-butylene glycol, 1,3-(2 ethyl) hexane diol, 2,2,4-trimethyl-1,3-pentanediol, trimethylol propane, 1,2,6-hexane triol, or phenyldiisopropanol-amine. Polypropylene ether polyols are particularly useful and readily commercially available (see Appendix B of Saunders & Frisch, supra). The aforementioned polyols can also be used as the polyol precursors for the xanthate salts used as catalysts in this invention.

Where the polyisocyanurate of this invention is made from polyisocyanate-polyol reaction mixtures, the mixtures can have NCO/OH equivalent ratios greater than 1, preferably at least about 1.2/1, and can be as high as 12/1 or greater. Typically, the NCO/OH ratio will be 1.2/1 to 6/1. Generally, the greater this ratio, the greater amount of isocyanurate linkage in the resulting product and the greater its hardness. The preferred products are those which are highly crosslinked by reason of having about 20 to 85% of the isocyanate groups in the reaction mixture converted to isocyanurate linkages, the rest of the isocyanate-derived linkages comprising urethane linkages or, in the event that moisture is present during polymerization, also urea linkages.

Where polyisocyanates are polytrimerized in the presence of a polyol, such as the poly(alkyleneoxy) polyols described above, instead of using the aforementioned xanthate salts as an added component to the reaction mixtures, the polyol can itself be modified and used in the form of a xanthate salt. Such a modified polyol acts as a catalyst as well as a reactant, and can be characterized as a "catalyzed" polyol. For example, a low molecular weight polyol, such as dipropylene glycol, can be reacted in a conventional manner with a low molecular weight, normally gaseous, 1,2-epoxyalkane, such as ethylene oxide or propylene oxide or a mixture of the two oxides, in the presence of a base, such as potassium hydroxide, to form an alkylene oxide adduct of said low molecular weight polyol. The resulting adduct, in the form of an alkali metal salt, can then be reacted with carbon disulfide to form a high molecular weight xanthate salt which can be used in a reactant amount with the polyisocyanate reactant.

Where a more highly crosslinked polymer is desired, a polyol-diisocyanate reaction mixture can include a conventional triisocyanate or a triol. The reaction mixture can also include modifying mono-isocyanates or alcohols such as 1,4-butane diol, butyl Cellosolve, butyl Carbitol, and oleyl alcohol, to impart special properties to the polymer product, such as the degree of final hardness.

The polytrimerization of the polyisocyanate reactant can be carried out with an amount of said xanthate salt sufficient to promote polytrimerization. This amount will be at least a catalytic amount, e.g. up to 10 weight percent of the polyisocyanate and preferably 0.5 to 5 weight percent of the polyisocyanate.

Filled polymer products can be made by incorporating into the reaction mixtures a host of different powdered, granular, fibrous or finely divided fillers (e.g. 5 to 95 weight percent of the reaction mixture) such as clay, talc, rubbery granular aggregate such as vulcanized rubber obtained as scrap from automobile or truck tires, titanium dioxide, diatomaceous earth, glass microbubbles and the like. Hollow glass spheroids or microbubbles are useful as fillers in making light-weight polyisocyanurate cellular articles. Co-reactant materials, such as the diamines described in U.S. Pat. No. 3,248,454 can be included in the polyol-polyisocyanate reaction mixture, e.g., to increase the viscosity or moldability thereof as well as to increase the hardness of the resulting product. Fire retardant fillers, such as polyvinyl chloride and antimony or phosphorous compounds can also be incorporated into the reaction mixture. Foamed or porous polyisocyanurate products of this invention can be made by incorporating a small amount of water and/or by blowing the reaction mixture with a blowing agent such as those disclosed in U.S. Pat. No. 3,072,582. Conventional foam stabilizing agents such as silicone oils or organosilicones can also be incorporated into such reaction mixtures to obtain foamed products with controlled porosity. Another useful foam stabilizer that can be used is a perfluoroalkyl amine, such as those disclosed in U.S. Pat. No. 3,378,399. Co-catalysts which can be used in conjunction with the xanthate salt catalysts of this invention include polyol soluble organic compounds and certain compounds of polyvalent metals, such as tin, lead, or mercury (see Brit. Pat. No. 1,053,-383). Examples of such co-catalysts are phenylmercuric acetate, phenylmercuric oleate, mercuric octoate, mercuric naphthenate, lead octoate, lead naphthenate, dibutyl tin dilaurate, dibutyl tin diacetate, and similar compounds.

The polyisocyanurate polymer made in accordance with this invention is a crosslinked polymer characterized by containing a plurality of isocyanurate linkages which impart thermal stability to the polymer. Each such linkage results from the trimerization of 3 isocyanate moieties, —NCO, having the formula

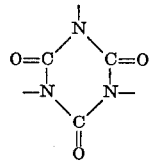

The xanthate salts used in this invention catalyze, promote or accelerate the formation of such isocyanurate linkages and, where polyol is present during trimerization, the xanthate salts also promote the concurrent formation of urethane linkages. By polytrimerizing isocyanate prepolymers based on polyols, the polyisocyanurates will also have urethane linkages which are inherently present in the isocyanate prepolymers. Thus, the term "polyisocyanurate" as used herein generically denotes a polymer having a plurality of isocyanurate linkages as well as a polymer having a plurality of isocyanurate linkages and urethane linkages unless indicated otherwise. These polyisocyanurates can have crosslink densities of 1 crosslink per 400 to 20,000 atomic weight units of polymer, the preferred rubbery polyisocyanurates having a crosslink density of 1 crosslink per 1000 to 5000 atomic weight units.

In addition to the aforementioned thermal stability, these polymers, more importantly, are hydrolytically stable and no significant change in physical properties, such as hardness, occurs in these polymers on standing or in use, even upon immersion in water or upon being subjected to high humidity and temperature environments (e.g. when tested by the procedure described in "Insulation," August 1968, p. 39).

The polyisocyanurate products of this invention can be used as binders for various fillers, such as vulcanized rubber aggregate, to provide paving surface, particularly such as those tracks or fields used for athletic or sporting purposes, and as coatings to provide protective surfaces, for example as rain-proof or water-resistant coatings for clothing. They can be used as laminating or prepregnating resins for sheets of glass fibers and as adhesives for bonding metal to metal, wood to wood, and metal to wood, and as potting compositions for insulating magnet coils or other electrical devices. They also can be used as tooling resins and to form shaped articles such as electrical connectors. The superior hydrolytic stability of the polyisocyanurate products of this invention means that they can be shaped in the form of articles that are subject to moisture contact during use or which come into contact with aqueous solvents or water, such as gaskets, seals, etc.

Further objects and advantages of this invention will be illustrated in the following examples, though particular materials and amounts thereof recited in these examples, as well as other details, should not be construed to unduly limit this invention. In these examples, the parts recited as parts by weight.

EXAMPLE 1

Dipropylene glycol in the amount 63.5 parts is mixed with 9.3 parts of a 51.6 wt. percent aqueous sodium hydroxide solution. The resulting reaction mixture is heated to 120° C. for about 8 hours, under a vacuum of about 25" of mercury to remove about 4.6 parts of water as a by-product. The resulting dipropylene glycol solution of the mono-sodium salt of dipropylene glycol is allowed to cool about 38° C. and about 9.2 parts of carbon disulfide is added to said solution, and the resulting reaction mixture allowed to exotherm to about 50° C. and thereafter stirred for an additional 15 min. The resulting dipropylene glycol solution of the xanthate salt, $$CH_3CH(OH)CH_2OCH_2CH(CH_3)OCS_2^-Na^+$$

has a yellow color, said solution being recovered in the amount of 75 parts.

EXAMPLE 2

In a plurality of runs, fifteen parts of a polypropylene ether triol having a molecular weight of 3000 (Niax LG-56) is mixed with varying amounts of the xanthate salt solution prepared substantially as described in Example 1 (using sodium metal as a source of base). The resulting polyol-xanthate salt solution is mixed with 15 parts of polymethylene polyphenyl polyisocyanate (Mondur MRS, having an equivalent weight of about 135) in a suitable container and the resulting reaction mixture allowed to cure at ambient temperatures (e.g. 25° C.). The gel times for the reaction mixtures of the various runs are noted and these times are correlated in the following table.

| Run | Amt. of catalyst soln. (parts) | Gel time [1] |
|---|---|---|
| 1 | 0.3 | No cure in 4 hrs. |
| 2 | 0.45 | 21 min. |
| 3 | 0.6 | 17 min. |
| 4 | 0.75 | 14 min. |
| 5 | 0.9 | 10.8 min. |
| 6 | 1.5 | 7.5 min. |

[1] Measured as the moment when reaction mixture develops a solid core upon prodding the mixture.

The above data show that gel time is a smooth and slowly varying function of catalyst concentration. Thus, good control of the pot-life of the reaction mixture can be obtained. By comparison, using the same amounts of the solution of mono-sodium salt of dipropylene glycol, prepared substantially as described in Example 1, as a catalyst instead of the xanthate salt solution, gel time is nearly instantaneous, being so rapid as to prevent normal stirring and mixing of the reaction mixture.

A polyisocyanurate prepared as described above, using 1.1 part of catalyst solution has a tensile strength of 3300 p.s.i. and an elongation to break of 20%.

EXAMPLE 3

A polyisocyanurate is prepared following the procedure described in Example 2, using 45 parts of the polypropylene ether triol in admixture with 5 parts of N-phenyldiisopropanol amine (Isonol C-100) and 2.5 parts of the xanthate salt solution, and using 50 parts of Mondur MRS. The resulting polyisocyanurate polymer, useful as a potting resin, has a tensile strength of about 3700 and an elongation to break at about 25%.

EXAMPLE 4

The procedure of Example 2 is followed using 51.6 parts of the polypropylene ether triol in admixture with 15 parts of Isonol C-100 and 2.5 parts of xanthate salt solution, and reacting the polyol-xanthate salt solution with 33.3 parts of the polyisocyanate. The resulting polyisocyanurate polymer, useful as a potting resin, has a tensile strength of about 1800 p.s.i. and an elongation to break at about 130%.

EXAMPLE 5

The procedure of Example 2 is followed, except that the polyol reactant is made up of 52 parts of the polypropylene ether polyol, 25 parts of DB castor oil, and 2.5 parts of the xanthate salt solution. The polyol-xanthate salt solution is reacted with 50 parts of the polyisocyanate to yield a polyisocyanurate polymer, useful as a potting resin, having a tensile strength of 3200 p.s.i. and an elongation to break at about 35%.

EXAMPLE 6

Four parts of a polypropylene ether glycol having a molecular weight of about 2,000 is mixed with a polypropylene ether triol having a molecular weight of 420 and with 0.2 part of the xanthate salt solution described in Example 1. One part of the resulting polyol-xanthate salt solution is mixed with 1 part of Mondur MRS in a suitable container and the reaction mixture allowed to cure at ambient temperature to yield a polyisocyanurate useful as an adhesive.

EXAMPLE 7

A "catalyzed" polyol is prepared by reacting, in a first step, 86 parts of glycerin with 3.2 parts of 90 wt. percent aqueous potassium hydroxide at 115° C. in a closed vessel to form a mono-salt of the polyol. A stream of propylene oxide gas is then continuously pressured into the vessel, as a second step, and allowed to react with the mono-salt at 125° C. and 50 p.s.i.g. After all of the propylene oxide is added (about 1450 parts) the reaction mixture is stirred for a further 2 hours at 125° C. to complete the reaction. Thereafter the vessel is evacuated for 1 hour with stirring at 125° C. to remove unreacted propylene oxide. Four parts of carbon disulfide is then added, as a third step, to the resulting propylene oxide adduct salt after cooling and the mixture stirred for about 15 min., yielding about 1540 parts of "catalyzed" polyol having a molecular weight of about 1500, this product hereinafter referred to as "Catalyzed" polyol "A."

The above procedure is repeated using 47.5 parts of propylene glycol instead of the glycerin to yield a "catalyzed" polyol, hereinafter referred to as "B," having a molecular weight of about 2000.

EXAMPLE 8

Twenty parts of catalyzed polyol "A," prepared as described in Example 7, is mixed with 10 parts of Mondur MRS. Before the mixture cures, part of it is coated in various thicknesses on polyester film and cures in 3 min. at 100° C., and part of the reaction mixture is poured into a thin can and cures over night at ambient temperature (ca. 25° C.) in the form of a disc. The coating of the resulting polyisocyanurate on the film of polyester is flexible, thicker portions of the coating being removable with difficulty from the polyester film and the inner coatings tenaciously adhering to the polyester film. The disc of polyisocyanurate is also flexible.

The above procedure is repeated in two further runs, using in one run catalyzed polyol "B" instead of "A," and in the other run reacting a mixture of 8 parts of catalyzed polyol "A" and 25 parts of catalyzed polyol "B" with 17 parts of the polyisocyanate, yielding similar polyisocyanurate coatings and discs.

EXAMPLE 9

A composite of vulcanized rubber particles bonded with polyisocyanurate made in accordance with this invention is made based on the following formulation:

| | Parts |
|---|---|
| Vulcanized rubber particles | 400 |
| Polypropylene ether glycol (2000 mol weight) | 50 |
| Polypropylene ether triol (1500 mol weight) | 15 |
| Xanthate salt catalyst solution (prepared as described in Example 1) | 3 |
| Polymethylene polyphenyl polyisocyanate (Mondur MRS) | 32 |

The particulate vulcanized rubber used in this formulation is obtained by abrading or shredding used automobile and truck tire tread and is a blend of vulcanized natural rubber and SBR rubber, the blend having a range of particle size such that all of it passes through a screen with ½" openings.

In preparing the composite, following the above formulation, the glycol, triol, xanthate salt catalyst solution, and polyisocyanate are mixed in a suitable container to provide a homogeneous solution, the NCO/OH equivalent ratio of the solution being about 2/1. The vulcanized rubber particles are added to this solution and the blend mixed until all of the particles are uniformly wetted or coated with the solution. The mass of coated particles is then poured into a flat rectangular mold, 1' x 2' x 8", and 75 lbs./ft.² pressure is applied to the top of the mass of coated particles while the coating cures. The resulting cured, permeable composite, having a density of about 0.7 g./cc. and a free void space content of about 40 vol. percent is then sliced to provide ¼" thick slabs of composite. Samples of the composite are tested for physical properties and these are summarized below.

| | | |
|---|---|---|
| Tensile strength (ASTM D–412) | p.s.i. | 75.7 |
| Elongation (ASTM 4–412) | percent | 32.5 |
| Tear strength (ASTM D–624, Die C) | p.s.i. | 22.7 |
| Compression modulus (ASTM D–575): | | |
| At 10% compression | p.s.i. | 15 |
| At 50% compression | p.s.i. | 350 |
| Impact resilience (ASTM D–2632) | | 28 |
| Hydrolytic stability [1] | days [2] | 31 |

[1] This property is measured by subjecting the sample to an environment of 100° C. and 95% relative humidity, according to the tests described in Insulation, August 1968, p. 39.
[2] After subjecting sample to the 100° C., 95% RH environment, no apparent change in the sample is noted, indicating structural integrity is maintained.

A ¼" thick layer of the composite prepared as described above is bonded to an asphalt substrate with a conventional two-part room temperature-curable polyurethane adhesive to provide a supported structure useful as a resilient surfacing or pavement for pedestrian or vehicular traffic or for athletic activities.

EXAMPLE 10

To 100 parts of an isocyanate prepolymer (having an isocyanate equivalent wt. of about 170), made by reacting 66.1 parts of mixed tolylene diisocyanate isomers with 17.7 parts of polypropylene glycol (mol wt. 2000) and 16.2 parts of tripropylene glycol, is added 1 part of the xanthate salt solution of Example 1. The resulting mixture gels in about 5 min. at ambient temperature (ca. 25° C.) to form a hard, brittle, polyisocyanurate, useful as a binder glass cloth laminates.

In another run, 50 parts of said isocyanate prepolymer is mixed with 50 parts of polypropylene ether triol (mol wt. 3000) and 1 part of the xanthate salt solution of Example 1 to produce a tough, semi-rigid polyisocyanurate, useful as a potting resin, glass cloth laminating resin, and as a binder to make fibrous composites.

Various modifications and alterations of this invention will become apparent to those skilled in the art without departing from the scope and spirit of this invention.

We claim:

1. A method of making polyisocyanurate, comprising polytrimerizing organic polyisocyanate in the presence of polyol solution of a catalytic amount of a xanthate salt comprising the formula

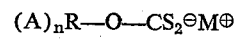

$$(A)_n R\text{—}O\text{—}CS_2^{\ominus} M^{\oplus}$$

where A is hydroxyl or hydrogen, R is a polyvalent saturated straight or branched chain aliphatic group which can have one or more catenary ether oxygen atoms, with the proviso that where A is hydrogen said R has one or more of said catenary ether oxygen atoms, $n$ is an integer equal to $x-1$, where $x$ is the valence of R, and $M^{\oplus}$ is an alkali metal or quaternary ammonium cation, said solution being at least 0.01 molal in said xanthate salt.

2. A method of making polyisocyanurate, comprising polytrimerizing organic polyisocyanate in the presence of polyol solution of a catalytic amount of a xanthate salt comprising the formula $$HO-R-O-CS_2^\ominus M^\oplus$$

where R is alkyleneoxyalkylene or poly(alkyleneoxy) alkylene, and $M^\oplus$ is an alkali metal cation, said solution being at least 0.01 molal in said xanthate salt.

3. The method according to claim 2 wherein said R is propyleneoxypropylene and $M^\oplus$ is sodium or potassium cation.

4. The method according to claim 2, wherein said R is poly(propyleneoxy)propylene and $M^\oplus$ is sodium or potassium cation.

5. The method according to claim 2 wherein said xanthate salt is used as a solution in polypropylene ether glycol or triol.

6. The method according to claim 2 wherein said polyisocyanate is polymethylene polyphenyl polyisocyanate.

7. The method according to claim 2 wherein said polyisocyanate is an isocyanate prepolymer of a polypropylene ether glycol or triol.

8. The method according to claim 2 wherein said polyisocyanate is an isocyanate prepoylmer of polypropylene ether glycol, polypropylene ether triol, or mixture of said glycol and said triol.

9. The method according to claim 2 wherein said xanthate salt is sodium dipropylene glycol mono-xanthate.

10. The method according to claim 2 wherein said xanthate salt is potassium polypropylene ether glycol mono-xanthate.

11. The method according to claim 2 wherein said xanthate salt is potassium polypropylene ether triol mono-xanthate.

12. A solution comprising a xanthate salt in a polyol, said xanthate salt having the formula $$(A)_n R-O-CS_2^\ominus M^\oplus$$

where A is hydroxyl or hydrogen, R is a polyvalent saturated straight or branched chain aliphatic group which can have one or more catenary ether oxygen atoms, with the proviso that where A is hydrogen said R has one or more of said catenary ether oxygen atoms, $n$ is an integer equal to $x-1$, where $x$ is the valence of R, and $M^\oplus$ is an alkali metal or quaternary ammonium cation, said solution being at least 0.01 molar in said xanthate salt.

13. The solution of claim 12 wherein said polyol is dipropylene glycol, polypropylene ether glycol, or polypropylene ether triol.

14. A polyol solution comprising a xanthate salt having the formula $$HO-R-O-CS_2^\ominus M^\oplus$$

where R is alkyleneoxyalkylene or poly(alkyleneoxy) alkylene, and $M^\oplus$ is an alkali metal cation, said solution being at least 0.01 molal in said xanthate salt.

References Cited

UNITED STATES PATENTS

| | | | |
|---|---|---|---|
| 3,108,100 | 10/1963 | Tate et al. | 260—248 |
| 3,135,711 | 6/1964 | Thoma et al. | 260—30.4 |
| 3,248,372 | 4/1966 | Bunge | 260—77.5 |
| 3,252,942 | 5/1966 | France et al. | 260—77.5 |
| 3,280,066 | 10/1966 | France et al. | 260—31.2 |
| 3,381,008 | 4/1968 | Steyermark | 260—248 |

OTHER REFERENCES

Wagner & Zook, Synthetic Organic Chemistry (Wiley & Sons, New York, 1953, p. 43.

DONALD E. CZAJA, Primary Examiner

H. S. COCKERAM, Assistant Examiner

U.S. Cl. X.R.

252—182, 439, 476; 260—77.5 AB, 77.5 AC, 455 C, 858